United States Patent
Muggler et al.

(10) Patent No.: US 7,411,799 B2
(45) Date of Patent: Aug. 12, 2008

(54) APPARATUS AND METHOD FOR REGULATING A SWITCHING DEVICE

(75) Inventors: Patrick Muggler, Dallas, TX (US); David John Baldwin, Allen, TX (US); Roy Clifton Jones, III, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 337 days.

(21) Appl. No.: 11/190,718

(22) Filed: Jul. 27, 2005

(65) Prior Publication Data

US 2007/0024341 A1    Feb. 1, 2007

(51) Int. Cl.
*H02M 3/07* (2006.01)
(52) U.S. Cl. .......................................... 363/60
(58) Field of Classification Search .................... 363/59
See application file for complete search history.

(56) References Cited

U.S. PATENT DOCUMENTS

| | | | |
|---|---|---|---|
| 6,107,862 A * | 8/2000 | Mukainakano et al. ...... | 327/536 |
| 6,169,444 B1 * | 1/2001 | Thurber, Jr. ................. | 327/536 |
| 6,226,194 B1 * | 5/2001 | Bayer et al. .................. | 363/60 |
| 6,359,797 B1 * | 3/2002 | Bayer et al. .................. | 363/60 |
| 6,438,005 B1 * | 8/2002 | Walter ......................... | 363/60 |
| 6,504,349 B2 * | 1/2003 | Jaworski ..................... | 323/280 |
| 6,650,555 B2 * | 11/2003 | Suzuki et al. ................ | 363/60 |
| 6,738,272 B2 * | 5/2004 | Yamanaka et al. ........... | 363/60 |
| 7,142,040 B2 * | 11/2006 | Naka et al. .................. | 327/536 |

* cited by examiner

*Primary Examiner*—Jeffrey L Sterrett
(74) *Attorney, Agent, or Firm*—Warren L. Franz; Wade J. Brady, III; Frederick J. Telecky, Jr.

(57) ABSTRACT

An apparatus for regulating a switching device that couples an output locus with one of a first voltage locus and a second voltage locus in response to a driver unit includes: a voltage feedback unit coupling the driver unit with at least one of the first voltage locus and the second voltage locus. The feedback unit provides a voltage feedback signal to the driver unit. The driver unit responds to the voltage feedback signal to affect the coupling by the switching device.

9 Claims, 2 Drawing Sheets

US 7,411,799 B2

APPARATUS AND METHOD FOR REGULATING A SWITCHING DEVICE

BACKGROUND OF THE INVENTION

The present invention is directed to switching devices coupling an output locus with one of a first voltage source and a second voltage source, and especially to switching devices embodied in a charge pump devices.

A typical prior art charge pump device relies on voltage feedback that controls frequency of an oscillator unit, such as a voltage controlled oscillator (VCO) unit. Problems are experienced using such circuitry in that frequency variation limits output current range of the VCO unit which limits the regulating capability of the charge pump device. Further, voltage spikes are commonly generated using such circuitry; those voltage spikes have amplitudes that are inversely proportional to the frequency of the voltage feedback signal. The amplitudes of the voltage spikes vary significantly with the load current applied to the charge pump device, resulting in an unstable arrangement.

Another prior art charge pump device is a regulator-based charge pump device that relies on an input voltage being regulated by a pre-regulator unit. This configuration dissipates significant power and occupies increased chip area over a VCO controlled configuration, both of which characteristics are disadvantageous in today's market where smaller more compact products are desired.

There is a need for an apparatus and method for regulating a switching device that reduces limitations for load current range for frequency regulated switching devices, such as frequency regulated charge pumps.

There is a need for an apparatus and method for regulating a switching device that required less power and less chip area than prior art regulator-based regulated switching devices.

SUMMARY OF THE INVENTION

An apparatus for regulating a switching device that couples an output locus with one of a first voltage locus and a second voltage locus in response to a driver unit includes: a voltage feedback unit coupling the driver unit with at least one of the first voltage locus and the second voltage locus. The feedback unit provides a voltage feedback signal to the driver unit. The driver unit responds to the voltage feedback signal to affect the coupling by the switching device.

It is, therefore, an object of the present invention to provide an apparatus and method for regulating a switching device that reduces limitations for load current range for frequency regulated switching devices, such as frequency regulated charge pumps.

It is a further object of the present invention to provide an apparatus and method for regulating a switching device that required less power and less chip area than prior art regulator-based regulated switching devices.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Solely by way of example and not by way of limitation, the apparatus and method for regulating a switching device of the present invention will be described in a switching device embodied in a charge pump apparatus.

Figure 1:
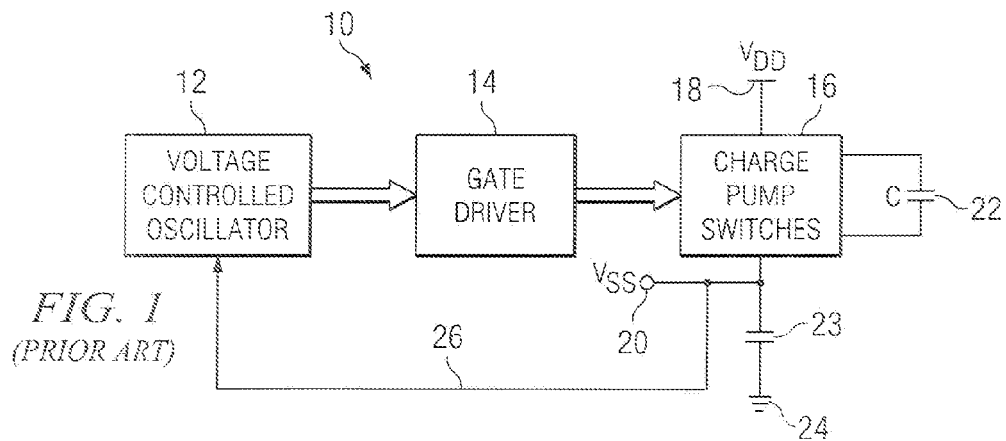
FIG. 1 is a schematic diagram illustrating a prior art frequency regulated charge pump apparatus.

FIG. 1 is a schematic diagram illustrating a prior art frequency regulated charge pump apparatus. In FIG. 1, a switching apparatus embodied in a charge pump apparatus 10 includes a voltage controlled oscillator (VCO) unit 12, a gate driver unit 14, a charge pump switch unit 16 driving a load 22 embodied in a capacitor C. Charge pump switch unit 16 responds to drive signals from gate driver unit 14 to selectively couple load 22 with one of a high voltage signal $V_{DD}$ at a first voltage locus 18 or a low voltage signal $V_{SS}$ at a second voltage locus 20. Second voltage locus 20 is coupled with ground 24 via a capacitor 23. Second voltage locus 20 is coupled with VCO unit 12 via a line 26 to provide a voltage control signal to VCO unit 12. VCO unit 12 responds to voltage control signals received via line 26 to regulate gate driver signal 14 in its driving of charge pump switch unit 16.

As mentioned earlier, frequency variation limits output current range of VCO unit 12 which limits the regulating capability of charge pump device 10. Further, voltage spikes are commonly generated using VCO control circuitry of the sort illustrated in FIG. 1. The voltage spikes have amplitudes that are inversely proportional to the frequency of the voltage feedback signal, and the amplitudes of the voltage spikes vary significantly with the load current through load 22. An unsatisfactorily unstable arrangement results.

Figure 2:
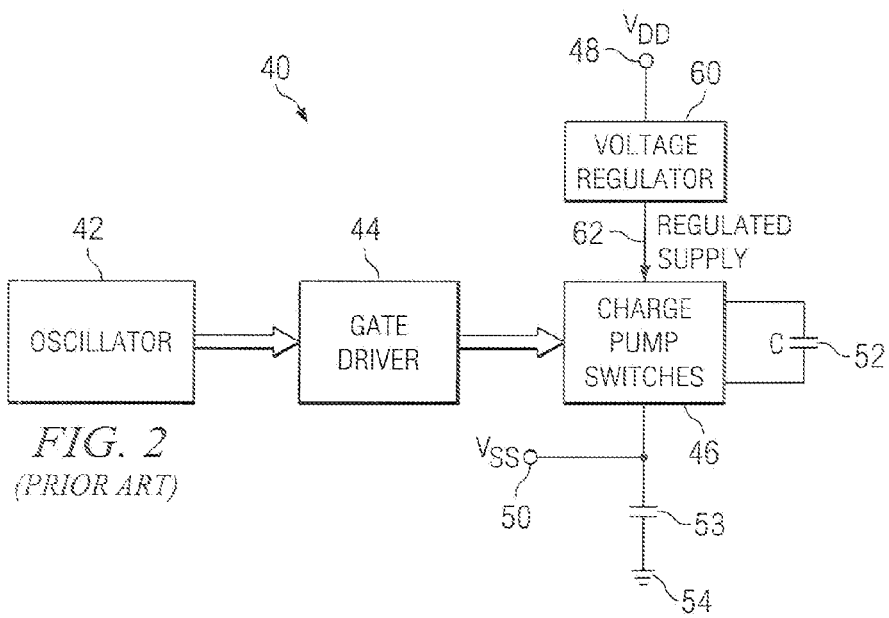
FIG. 2 is a schematic diagram illustrating a prior art regulator-based regulated charge pump apparatus.

FIG. 2 is a schematic diagram illustrating a prior art regulator-based regulated charge pump apparatus. In FIG. 2, a switching apparatus embodied in a charge pump apparatus 40 includes an oscillator unit 42, a gate driver unit 44, a charge pump switch unit 46 driving a load 52 embodied in a capacitor C. Charge pump switch unit 46 responds to drive signals from gate driver unit 44 to selectively couple load 52 with one of a high voltage signal $V_{DD}$ at a first voltage locus 48 or a low voltage signal $V_{SS}$ at a second voltage locus 50. Second voltage locus 50 is coupled with ground 54 via a capacitor 53. First voltage locus 48 is coupled to provide high voltage signal $V_{DD}$ via a voltage regulator unit 60. Voltage regulator unit 60 provides a regulated high voltage signal $V_{DD}$ via an output locus 62 to charge pump switch unit 46. Regulation of operation of charge pump switch unit 46 is effected by regulating high voltage signal $V_{DD}$ using voltage regulator unit 60.

As mentioned earlier, a regulator-based regulated charge pump apparatus dissipates significant power and occupies increased chip area over the VCO controlled configuration illustrated in FIG. 1, both of which characteristics are disadvantageous in today's market where smaller more compact products are desired.

Figure 3:
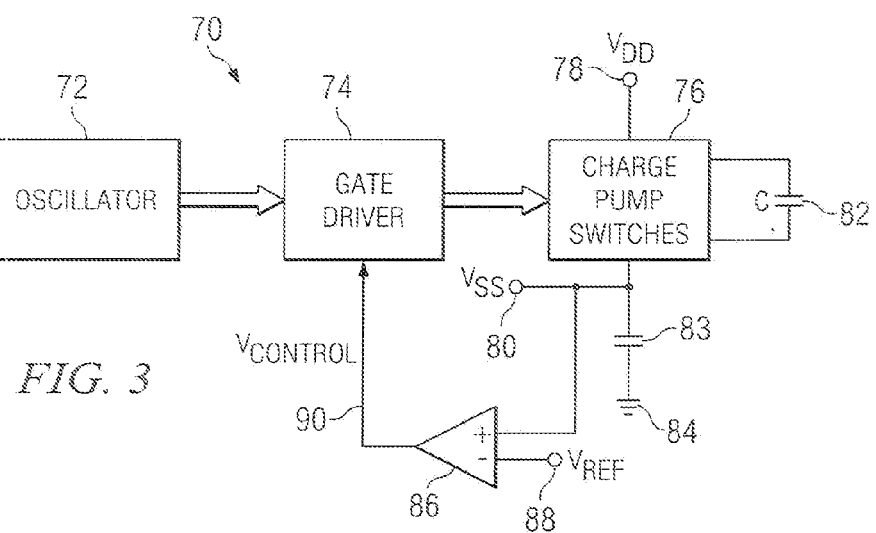
FIG. 3 is a schematic diagram illustrating a regulated charge pump apparatus configured according to the teachings of the present invention.

FIG. 3 is a schematic diagram illustrating a regulated charge pump apparatus configured according to the teachings of the present invention. In FIG. 3, a switching apparatus embodied in a charge pump apparatus 70 includes an oscillator unit 72, a gate driver unit 74, a charge pump switch unit 76 driving a load 82 embodied in a capacitor C. Charge pump switch unit 76 responds to drive signals from gate driver unit 74 to selectively couple load 82 with one of a high voltage signal $V_{DD}$ at a first voltage locus 78 or a low voltage signal $V_{SS}$ at a second voltage locus 80. Second voltage locus 80 is coupled with ground 84 via a capacitor 83. Second voltage locus 80 is coupled with gate driver unit 74 via a comparing unit 86 and a feedback line 90 to provide a voltage control signal $V_{CONTROL}$ to gate driver unit 74. Signals produced by comparing unit 86 for presentation on line 90 are related with comparison by comparing unit 86 of signals appearing at second voltage locus 80 with a reference voltage $V_{REF}$ present at a reference voltage locus 88. Gate driver unit 74 responds to voltage control signals received via line 90 to regulate gate driver signal 74 in its driving of charge pump switch unit 76 (see FIG. 4, discussed below).

Figure 4:
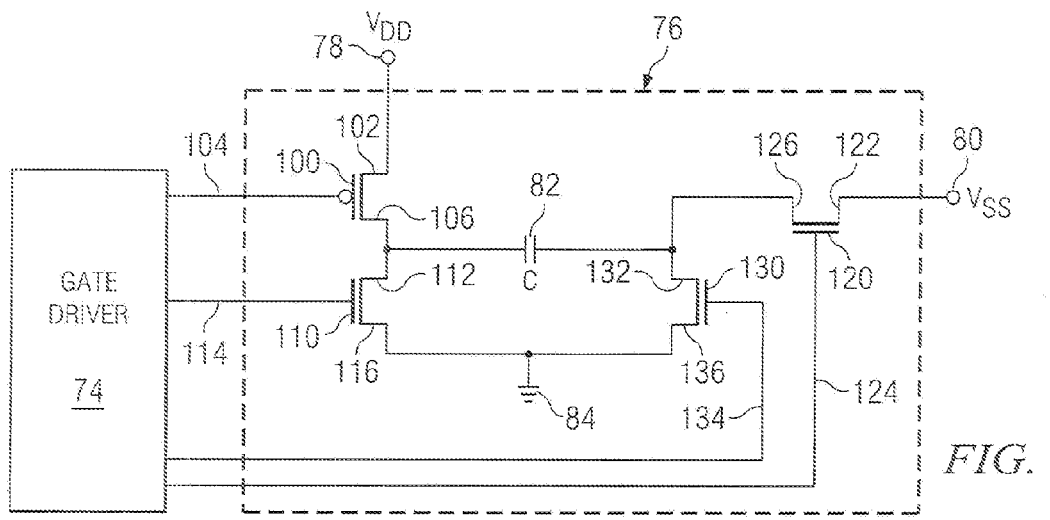
FIG. 4 is an electrical schematic diagram illustrating details of the charge pump switches in the charge pump apparatus of FIG. 3.

FIG. 4 is an electrical schematic diagram illustrating details of the charge pump switches in the charge pump apparatus of FIG. 3. In FIG. 4, charge pump switch unit 76 responds to drive signals from gate driver unit 74 to selectively couple load 82 with one of a high voltage signal $V_{DD}$ at a first voltage locus 78 or a low voltage signal $V_{SS}$ at a second voltage locus 80.

Charge pump switch unit 76 includes a PMOS transistor 100 and an NMOS transistor 110 coupled between first voltage locus 78 and ground 84. PMOS transistor 100 includes a source 102 coupled with first voltage locus 78, a gate 104 coupled with gate driver unit 74 and a drain 106 coupled with load 82. NMOS transistor 110 includes a drain 112 coupled with load 82, a gate 114 coupled with gate driver unit 74 and a source 116 coupled with ground 84.

Charge pump switch unit 76 also includes an NMOS transistor 120 and a NMOS transistor 130 coupled between second voltage locus 80 and ground 84. NMOS transistor 120 includes a source 122 coupled with second voltage locus 80, a gate 124 coupled with gate driver unit 74 and a drain 126 coupled with load 82. NMOS transistor 130 includes a source 132 coupled with load 82, a gate 134 coupled with gate driver unit 74 and a drain 136 coupled with ground 84.

Figure 5:
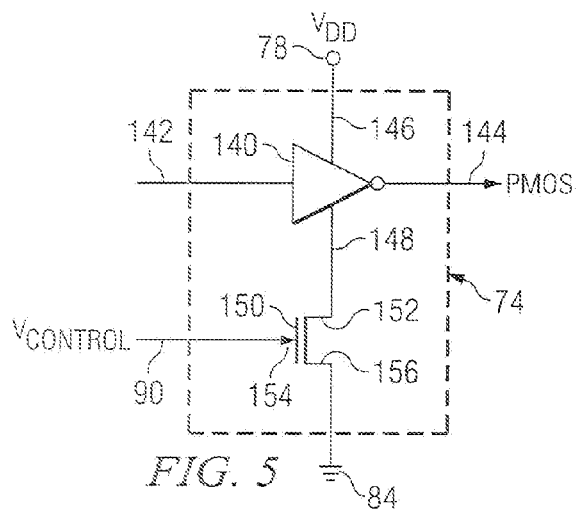
FIG. 5 is an electrical schematic diagram illustrating details of a first embodiment of the gate driver unit in the charge pump apparatus of FIG. 3.

FIG. 5 is an electrical schematic diagram illustrating details of a first embodiment of the gate driver unit in the charge pump apparatus of FIG. 3. In FIG. 5, a gate driver unit 74 includes a buffer configured as an inverter unit 140 receiving input signals from an oscillator (e.g., oscillator unit 72; FIG. 3) at an input locus 142 and presenting driver signals at an output locus 144. Inverter unit 140 has a first reference locus 146 coupled with first voltage locus 78 and a second reference locus 148 coupled with ground 84 via an NMOS transistor 150. NMOS transistor 150 has a drain 152 coupled with inverter unit 140 at second reference locus 148, a gate 154 and a source 156 coupled with ground 84. Gate 154 is coupled with line 90 for receiving control signals $V_{CONTROL}$ (FIG. 3). Gate driver unit 74 responds to control signals $V_{CONTROL}$ by effecting gating of NMOS transistor 150 to affect output drive signals presented at output locus 144. Gate driver unit 74 is configured for driving charge pump switch unit 76 by providing output signals presented at output locus 144 for gating signals controlling PMOS transistor 100 (FIG. 5).

Figure 6:
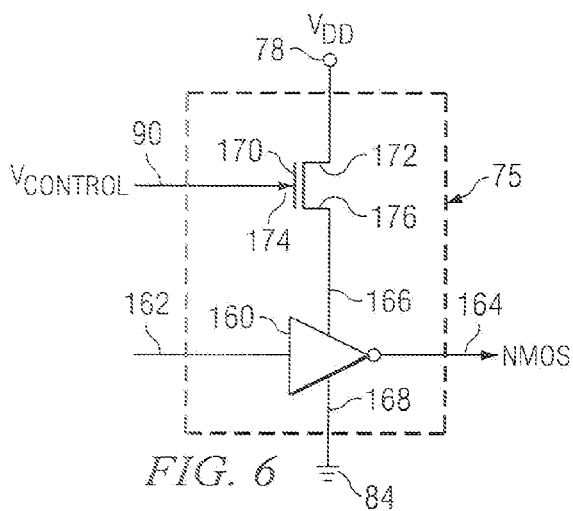
FIG. 6 is an electrical schematic diagram illustrating details of a second embodiment of the gate driver unit in the charge pump apparatus of FIG. 3.

FIG. 6 is an electrical schematic diagram illustrating details of a second embodiment of the gate driver unit in the charge pump apparatus of FIG. 3. In FIG. 6, a gate driver unit 75 is configured similarly to gate driver unit 74 (FIG. 5) but intended for effecting gating of at least one of NMOS transistors 110, 120 in a charge pump switch unit 76 (FIG. 4). Gate driver unit 75 includes an amplifier or buffer configured as an inverter unit 160 receiving input signals from an oscillator (e.g., oscillator unit 72; FIG. 3) at an input locus 162 and presenting driver signals at an output locus 164. Inverter unit 160 has a first reference locus 166 coupled with first voltage locus 78 and a second reference locus 148 coupled with ground 84 via an NMOS transistor 170. NMOS transistor 170 has a source 172 coupled with first voltage locus 78, a gate 174 and a drain 176 coupled with inverter unit 160 at first reference locus 166. Gate 174 is coupled with line 90 for receiving control signals $V_{CONTROL}$ (FIG. 3). Gate driver unit 75 responds to control signals $V_{CONTROL}$ by effecting gating of NMOS transistor 170 to affect output drive signals presented at output locus 164. Gate driver unit 75 is configured for driving charge pump switch unit 76 by providing output signals presented at output locus 164 for gating signals controlling at least one of NMOS transistors 110, 120 (FIG. 5).

Figure 7:
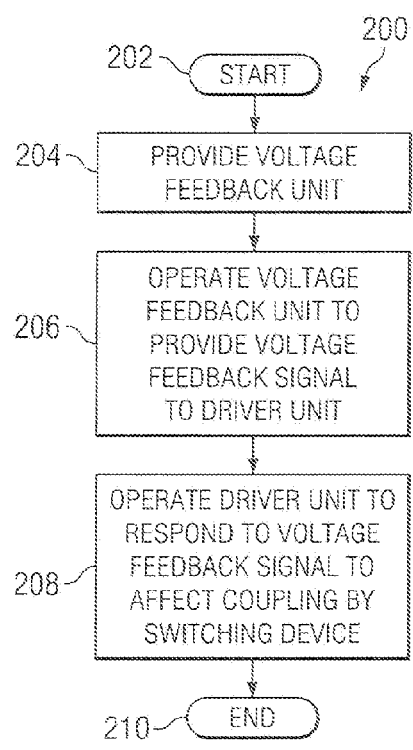
FIG. 7 is a flow chart illustrating the method of the present invention.

FIG. 7 is a flow chart illustrating the method of the present invention. In FIG. 7, a method 200 for regulating a switching device begins at a START locus 202. The switching device couples an output locus with one of a first voltage locus and a second voltage locus in response to a driver unit. Method 200 continues by providing a voltage feedback unit coupling the driver unit with at least one of the first voltage locus and the second voltage locus, as indicated by a block 204. Method 200 continues by operating the feedback unit to provide a voltage feedback signal to the driver unit, as indicated by a block 206. Method 200 continues by operating the driver unit to respond to the voltage feedback signal to affect the coupling by the switching device, as indicated by a block 208. Method 200 terminates at an END locus 210.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A regulated charge pump apparatus, comprising:
   an oscillator;
   a gate driver;
   a charge pump switch, responsive to drive signals from the gate driver, for selectively coupling a load with one of a high voltage signal source and a low voltage signal source; and
   feedback circuitry having a comparator for comparing voltage at one of said high and low voltage signal sources with a reference voltage, and for providing a signal representative of said comparison to said gate driver to regulate a gate driver signal in its driving of the charge pump switch;
   said charge pump switch including first and second pairs of MOS transistors; said first pair of MOS transistors coupled between said high voltage signal source and ground, a first terminal of said load being coupled with commonly connected terminals of said first pair of MOS transistors; and said second pair of MOS transistors being coupled between said low voltage signal source and ground, a second terminal of said load being coupled with commonly connected terminals of said second pair of MOS transistors; and said gate driver including a buffer and another MOS transistor; said buffer having an input coupled to receive signals from said oscillator, an output coupled to provide driver signals to a gate of one transistor of one of said first and second MOS transistor pairs, a first reference input coupled to one of said high voltage signal source and ground, and a second reference input; said another MOS transistor coupling said second reference input to the other of said high voltage signal source and ground; said another MOS transistor having a gate coupled to receive said signal representative of said comparison from said comparator; and said gate driver being responsive to said signal received from said comparator to vary said driver signals to said gate of said one transistor of said one of said first and second MOS transistors pairs.

2. The apparatus of claim 1, wherein said gate driver is further adapted and configured for driving said charge pump switch by providing gating signals for controlling at least one transistor of the other of said first and second MOS transistor pairs.

3. The apparatus of claim 2, wherein said charge pump switch is adapted for selectively coupling a load embodied in a capacitor with one of said voltage signal sources.

4. The apparatus of claim 3, further comprising a second capacitor coupling said one of said high and low voltage signal sources to ground.

5. A regulated charge pump apparatus, comprising:
an oscillator;
a gate driver;
a charge pump switch, responsive to drive signals from the gate driver, for selectively coupling a load with one of a high voltage signal source and a low voltage signal source; and
feedback circuitry having a comparator for comparing voltage at said low voltage signal sources with a reference voltage and for providing a signal representative of said comparison to said gate driver to regulate a gate driver signal in its driving of the charge pump switch;

said charge pump switch including a PMOS transistor and an NMOS transistor coupled between said high voltage signal source and ground, a first terminal of said load being coupled with commonly connected drains of said PMOS and NMOS transistors; and said charge pump switch further including second and third NMOS transistors coupled between said low voltage signal source and ground, a second terminal of said load being coupled with a drain of the second NMOS transistor and a source of the third NMOS transistor; and said gate driver including an inverter and a fourth NMOS transistor; said inverter having an input coupled to receive signals from said oscillator, an output coupled to provide driver signals to a gate of said PMOS transistor, a first reference input coupled to one of said high voltage signal source and ground, and a second reference input; said fourth NMOS transistor coupling said second reference input to the other of said high voltage signal source and ground; said fourth NMOS transistor having a gate coupled to receive said signal representative of said comparison from said comparator; and said gate driver being responsive to said signal received from said comparator to vary said driver signals to said PMOS transistor.

6. The apparatus of claim 5, further comprising a capacitor coupling said low voltage signal source to ground.

7. The apparatus of claim 5, wherein said gate driver is further adapted and configured for driving said charge pump switch by providing gating signals for controlling at least one of the second and third NMOS transistors.

8. The apparatus of claim 7, wherein said charge pump switch is adapted for selectively coupling a load embodied in a capacitor with one of said voltage signal sources.

9. The apparatus of claim 8, further comprising a second capacitor coupling said low voltage signal source to ground.

* * * * *